United States Patent [19]
Ratliff, Jr.

[11] Patent Number: 5,787,878
[45] Date of Patent: Aug. 4, 1998

[54] SOLAR CONCENTRATOR

[76] Inventor: George D. Ratliff, Jr., 2314 Forest Dr., Pittsburgh, Pa. 15235

[21] Appl. No.: 717,716

[22] Filed: Sep. 23, 1996

[51] Int. Cl.⁶ ..................................................... F24J 2/02
[52] U.S. Cl. ........................ 126/680; 126/600; 126/605; 126/606
[58] Field of Search .................... 126/600, 601, 126/602, 603, 604, 605, 606, 607, 608, 682, 680, 688; 60/641.8, 641.15

[56] References Cited

U.S. PATENT DOCUMENTS

| | | |
|---|---|---|
| 260,657 | 7/1882 | Calver . |
| 509,393 | 11/1893 | Paine ............................... 126/603 |
| 608,755 | 8/1898 | Cottle . |
| 1,386,781 | 8/1921 | Harvey . |
| 3,118,437 | 1/1964 | Hunt .................................. 126/270 |
| 3,905,352 | 9/1975 | Jahn .................................. 126/270 |
| 4,266,530 | 5/1981 | Steadman ......................... 126/602 |
| 4,365,618 | 12/1982 | Jones ................................ 126/680 |
| 4,509,501 | 4/1985 | Hunter .............................. 126/602 |
| 4,832,002 | 5/1989 | Medina ............................. 126/605 |
| 5,058,675 | 10/1991 | Travis ............................... 126/602 |

FOREIGN PATENT DOCUMENTS

| | | | |
|---|---|---|---|
| 2356095 | 5/1978 | France . | |
| 2421347 | 10/1979 | France . | |
| 3238591 | 4/1984 | Germany | ................ 126/607 |

*Primary Examiner*—Carl D. Price

[57] ABSTRACT

A steam boiler (14) is situated on a tower (16) at the center of concentric tracks (17), (18), and (19). Poles (21) and (23) have wheels (25) running on the tracks. The poles are kept upright on the tracks with guylines (35) and struts (31) and (33). The poles carry frameworks (24) with mirrors (12) attached to them. As the earth turns, the poles move along the tracks, keeping the mirrors on the opposite side of the boiler from the sun and keeping sunlight focused approximately on the boiler. As the poles move, the frameworks pivot to fine tune the focusing. Each framework pivots about a horizontal axle (26) of the framework and about the vertical axis of one of the poles (21). Hydraulic cylinders (66) and (70) in series circuits (82) and (78) respectively pivot the frameworks collectively. The frameworks are arranged so the power needed to pivot the frameworks is the same on windy days and calm days. At night and when storms approach, the poles move to closely-spaced tracks (20) where the frameworks form a protective shell (38), (40), (41) and (42) around the mirrors.

17 Claims, 7 Drawing Sheets

SOLAR CONCENTRATOR

This invention concerns solar concentrators with mirrors which move around a central receiver.

BACKGROUND OF THE INVENTION

If power plants used solar energy instead of fossil fuel, the main cause of acid rain and global warming would be eliminated. However, present solar power plants are prohibitively expensive. Efforts to reduce the cost have reached an impasse due to the inherent limitations of heliostats used to concentrate sunlight. This invention provides a less expensive way to concentrate sunlight.

Concentrators use mirrors to focus sunlight onto a steam boiler. The mirrors must pivot about at least two axes to keep sunlight focused on the boiler. There are two types of concentrators—those with mirrors which pivot about stationary supports (heliostats), and those with mirrors which pivot about movable supports.

Concentrators with mirrors on movable supports have inherent advantages which are impossible to obtain with heliostats. They can be moved during the day to positions where they will intercept the maximum amount of sunlight. They can be moved to sheltered locations. They can be moved to positions from which the mirrors can be focused collectively and accurately with relatively inexpensive devices. Heretofore, concentrators with movable supports have not been used in full-size commercial power plants, partly because they could not focus the outlying mirrors with sufficient accuracy.

U.S. Pat. Nos. 260,657; 608,755; 1,386,781; 3,118,437 and 3,905,352 describe solar concentrators with mirrors on movable supports. The mirrors move about a steam boiler while pivoting about horizontal axes. Since these simple movements cannot keep all the mirrors focused, these concentrators are not accurate enough for commercial power plants. Furthermore, the concentrators are vulnerable to damage from wind storms, dust, and hail, and too bulky to be sheltered economically.

Robert Laurent's French Patent No. 2,356,095 describes a concentrator which is theoretically capable of keeping all the mirrors focused. Each mirror rotates about three axes instead of two as on prior concentrators. Trains move the mirrors around the receiver. The mirrors also pivot about inclined axles on the trains. Each track has only one rail, and the trains lean from side to side on the rails to pivot the mirrors about the rails. However, the mechanism for leaning the trains is not accurate enough. Furthermore, leaning the trains causes excessive friction between the wheels and the rails. Also, the trains are vulnerable to storms, dust, and hail. Therefore, this concentrator is not practical for power plants.

Laurent's French Patent No. 2,421,095 describes a concentrator which is similar to his earlier one, except that it has flexible mirrors which can be rolled up for protection from storms, dust, and hail. However, the flexible mirrors are subject to excessive deformations in light breezes.

U.S. Pat. No. 4,365,618 describes another solar concentrator with mirrors on movable supports which is theoretically capable of keeping all the mirrors focused. The moving support is a three-dimensional truss as large as the field of mirrors. The truss is moved around the receiver by motorized rollers attached to fixed posts. As the truss moves around the receiver, the mirrors pivot about horizontal and vertical axes. The concentrator is intended for use on amphitheater-shaped terrain, otherwise the radial dimension of the truss would be so large that the truss would be excessively heavy. In any case the truss is so bulky that it cannot be sheltered economically.

OBJECTS OF THE INVENTION

Since most prior concentrators with movable supports for the mirrors are not accurate enough for commercial power plants, one object of this invention is to improve the accuracy of focusing the mirrors.

Since prior concentrators are too expensive, another object is to find an economical way to pivot the mirrors. The mechanism should be simple, light weight, efficient, and automatic. And large numbers of mirrors should be pivoted collectively.

Another object is to protect the concentrator, and especially the mirrors, from wind, hail, rain, and dust. Concentrators are especially vulnerable to wind because they have a large surface area. The concentrator must withstand moderate winds during the day; and at night and during storms, the mirrors and their supports should be enclosed.

Wind power is also capable of overwhelming the motors which pivot the mirrors. And it is uneconomical to provide larger motors and more energy to overcome wind power. Instead, wind power must be utilized to help pivot the mirrors.

Other objects and advantages of the invention will become clear from the following description.

SUMMARY OF THE INVENTION

A steam boiler is situated on a tower at the center of concentric tracks. Poles with wheels run on the tracks. The poles are kept upright on the tracks with guylines and struts. The poles carry frameworks with mirrors attached to them.

As the earth turns, the poles move along the tracks, keeping the mirrors on the opposite side of the receiver from the sun and keeping sunlight focused approximately on the receiver. As the poles move, the frameworks pivot to fine tune the focusing. Each framework pivots about a horizontal axle supported on two poles and about a vertical axis of one its supporting poles. Hydraulic cylinders in series circuits pivot the frameworks collectively. The power required to pivot the frameworks is the same on windy days and calm cays because wind power is used to help pivot the frameworks. At night and when storms approach, the poles move to closely-spaced tracks where the frameworks form a protective shell around the mirrors.

DESCRIPTION OF THE CONCENTRATOR

Figure 1:
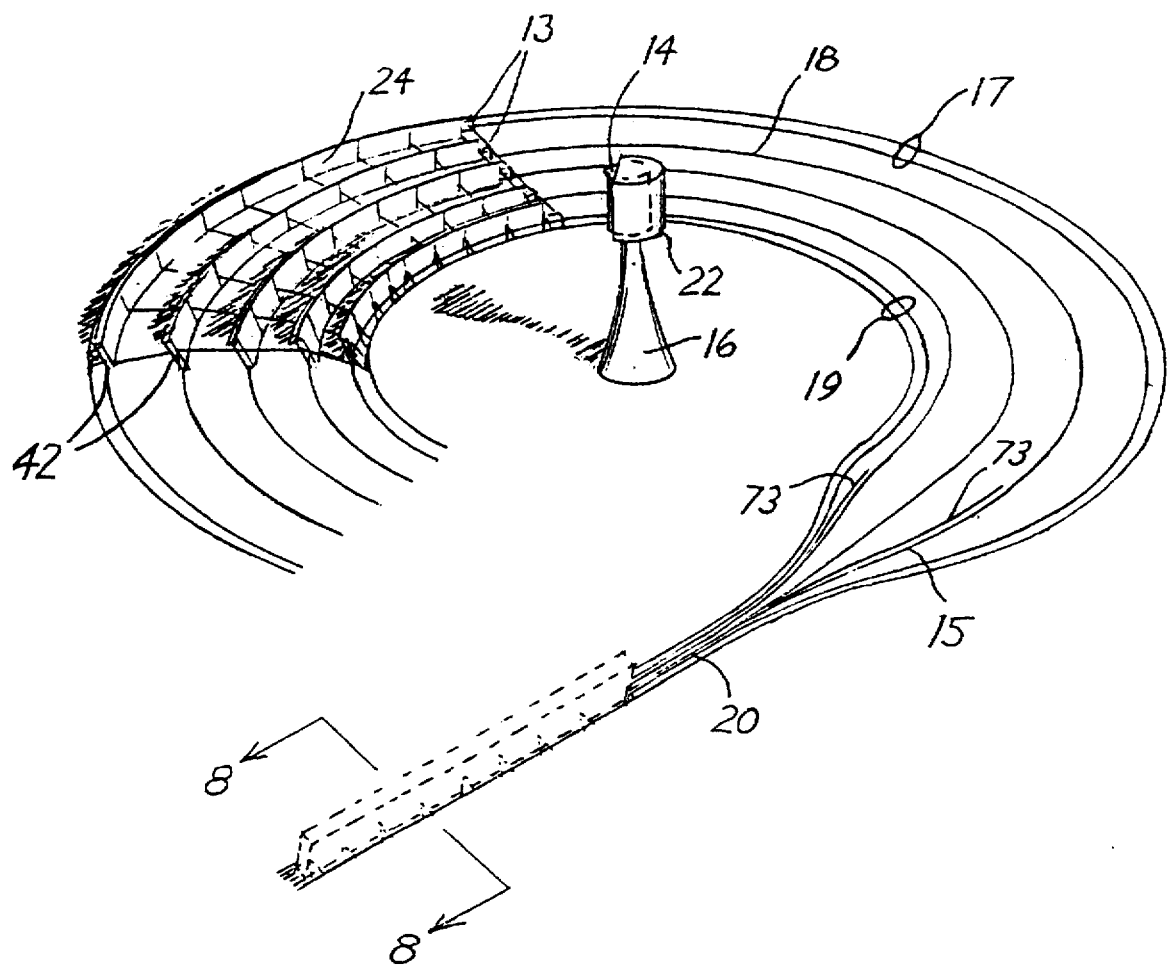
FIG. 1 is an overall view of the concentrator.

As shown in FIG. 1, a central receiver 14 is situated on a tower 16 at the center of concentric tracks. The outer tracks 17 and inner tracks 19 have two rails and the tracks 18 in between have one rail. South of the tower, the tracks 20 become closely spaced and parallel. The receiver is a steam boiler or a heat exchanger connected to a boiler. Transition tracks 15 connect the concentric tracks 17,18, and 19 to the parallel tracks 20. A rotatable hood 22 encloses the receiver on three sides.

Figure 2:
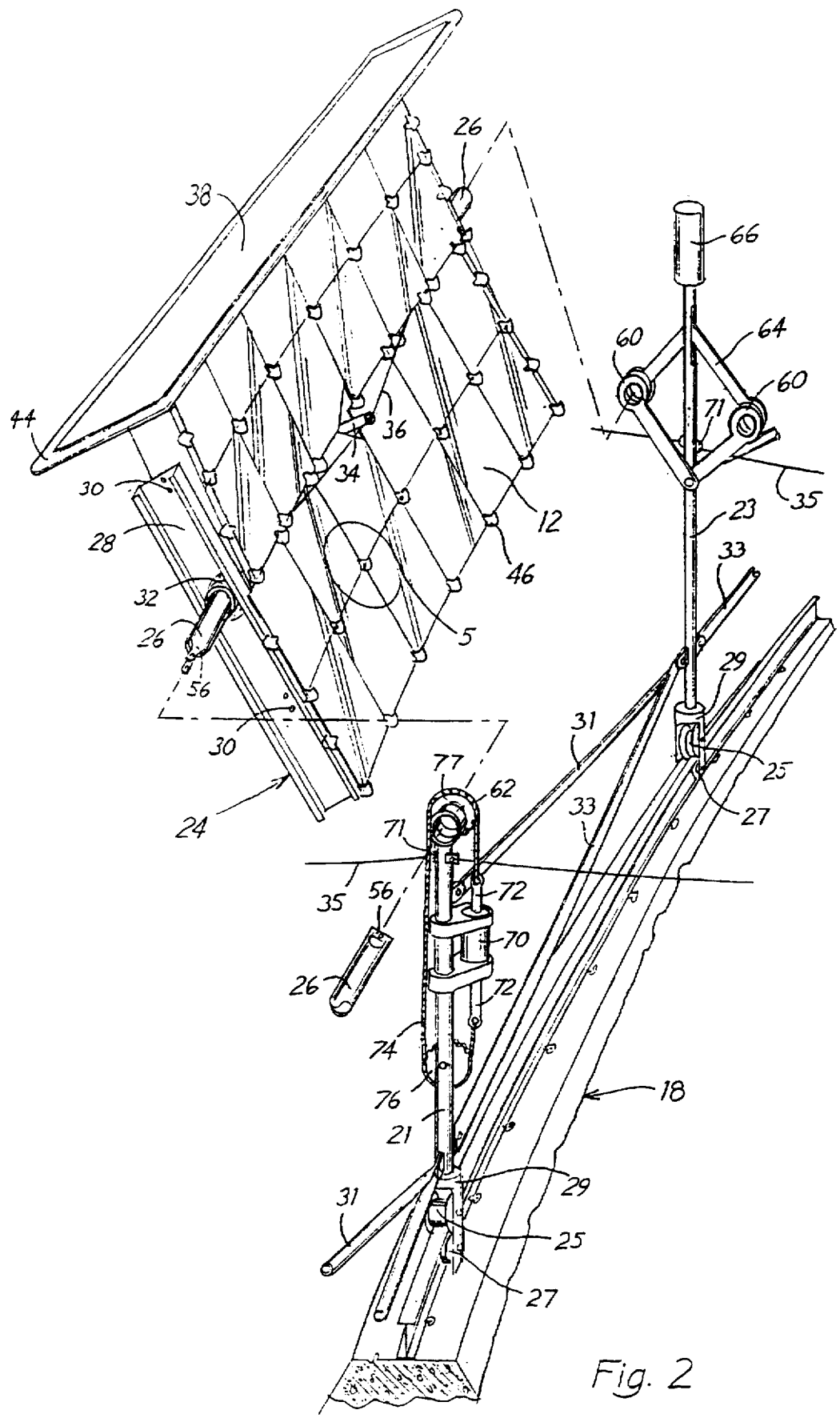
FIG. 2 is an enlarged isometric exploded view of a portion of the concentrator.

As shown in FIG. 2, two types of vehicles 21 and 23 are sequenced alternately on each track 18. The vehicles 21 and 23 are comprised of poles supported on spool-like wheels 25. Each pole also has a wheel 27 running under the rail flange. The wheels are attached to a caster 29 which swivels about the poles.

As shown in FIG. 2, the poles are kept upright and spaced apart by a latticework of guylines 35, struts 31 and 33, and frameworks 24. The poles on the same track 18 are linked together with two struts 31 and 33 and a rotatable framework 24 to form trains. A horizontal strut 33 connects the lower part of the poles. A diagonal strut 31 connects the upper part of a pole to the lower part of the next pole. Frameworks 24 connect the tops of the poles on the same track. Guylines 35 connect each pole to the nearest pole on the adjacent tracks.

Each framework 24 has a pipe axle 26 with beams 28 attached to the axle. The beams 28 are comprised of two back-to-back "C"-shaped cold-formed steel members lapped and connected to each other with bolts 30. Midway in the lapped connection, holes in the webs of both beams accommodate the pipe axle 26. A pipe bracket 32 connects the axle to the webs of the beams. The holes for the bolts 30 are slightly oversize to permit a scissor-like rotation of the lapped beams about the axle 26 before the bolts 30 are tightened. The axles are stiffened with spars 34 and wires 36 attached to the axles 26 to form trusses.

Figure 5:
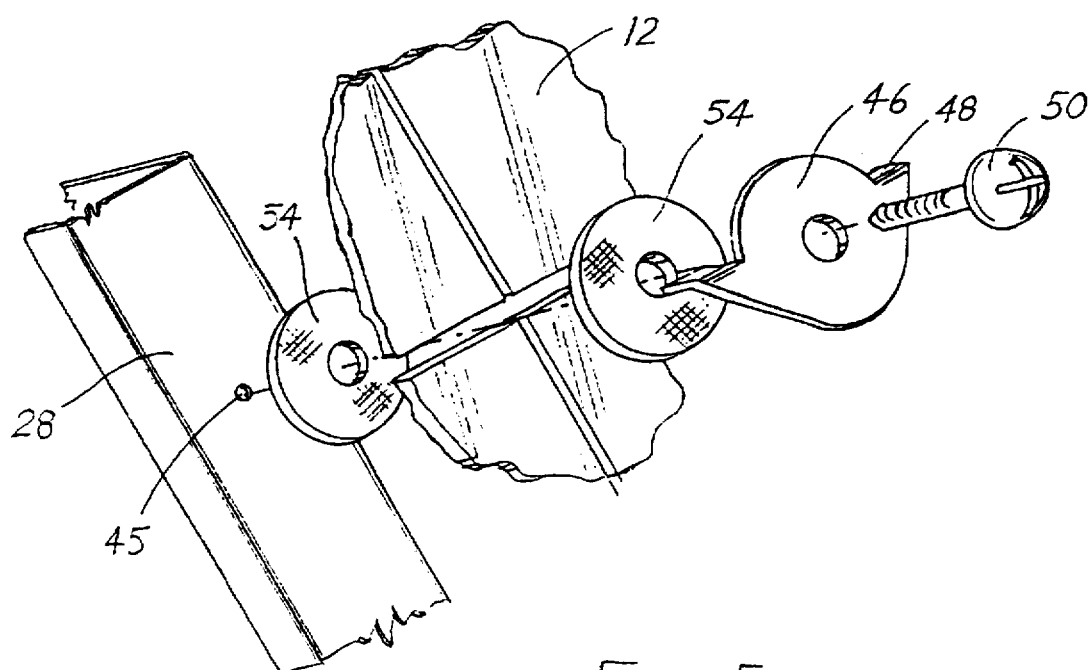
FIG. 5 is an enlarged isometric exploded view of a portion of FIG. 2 showing the method of clamping the mirrors to the frameworks.

As shown in FIGS. 2 and 5, the mirrors 12 are clamped to the beams 28. FIG. 5 shows that the corners of the mirrors 12 are clamped to the beams 28 with metal washers 46. The washers have tabs 48 which typically support the bottom edges of two mirrors 12. A screw fastener 50 engages a hole 45 in one of the beams 28. Rubber washers 54 are sandwiched between the metal washer 46 and the mirror 12 and between the mirror 12 and beam 28.

As shown in FIG. 2, a typical pole supports the ends of two frameworks 24. Poles 23 have two bearings 60, one for each framework 24. Poles 21 have only one bearing 62, in which the axle of one framework is journaled. However, the axle 26 extends through and beyond the bearing 62, and another axle 26 is coupled to it with a Cardan universal joint 56.

Figure 6:
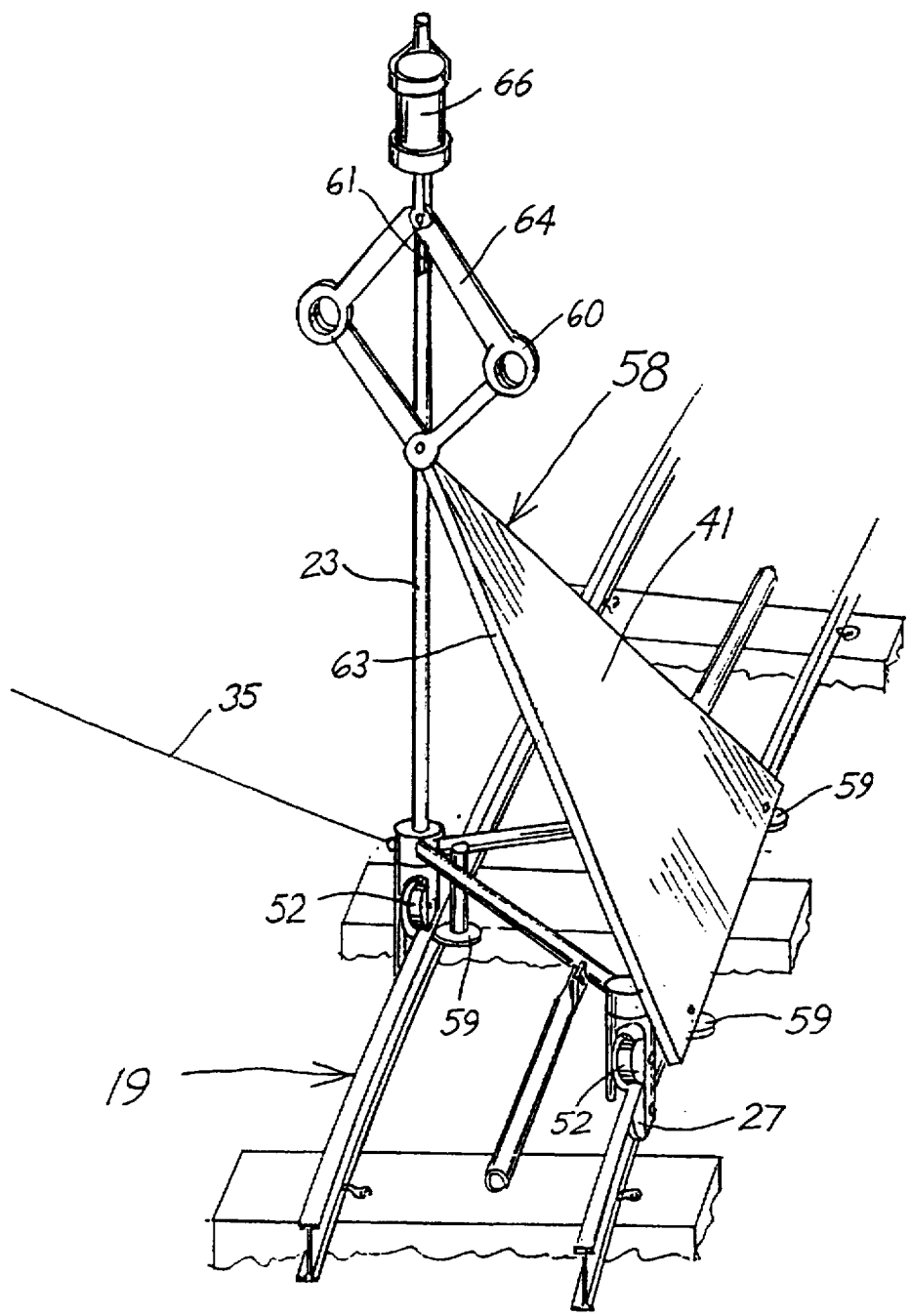
FIG. 6 is an enlarged isometric view of an anchorage car on the inner track.

As shown in FIG. 6, the cars 58 on the inner track 19 have rollers 59 in horizontal planes running on the sides of the track rails. The cars 57 on the outer tracks have similar wheels. The cars 57 and 58 have three wheels 52 each with one flange. Cars 57 and 58 also have two inclined struts 63 connecting the upper part of the poles to the base of the cars.

Figure 3:
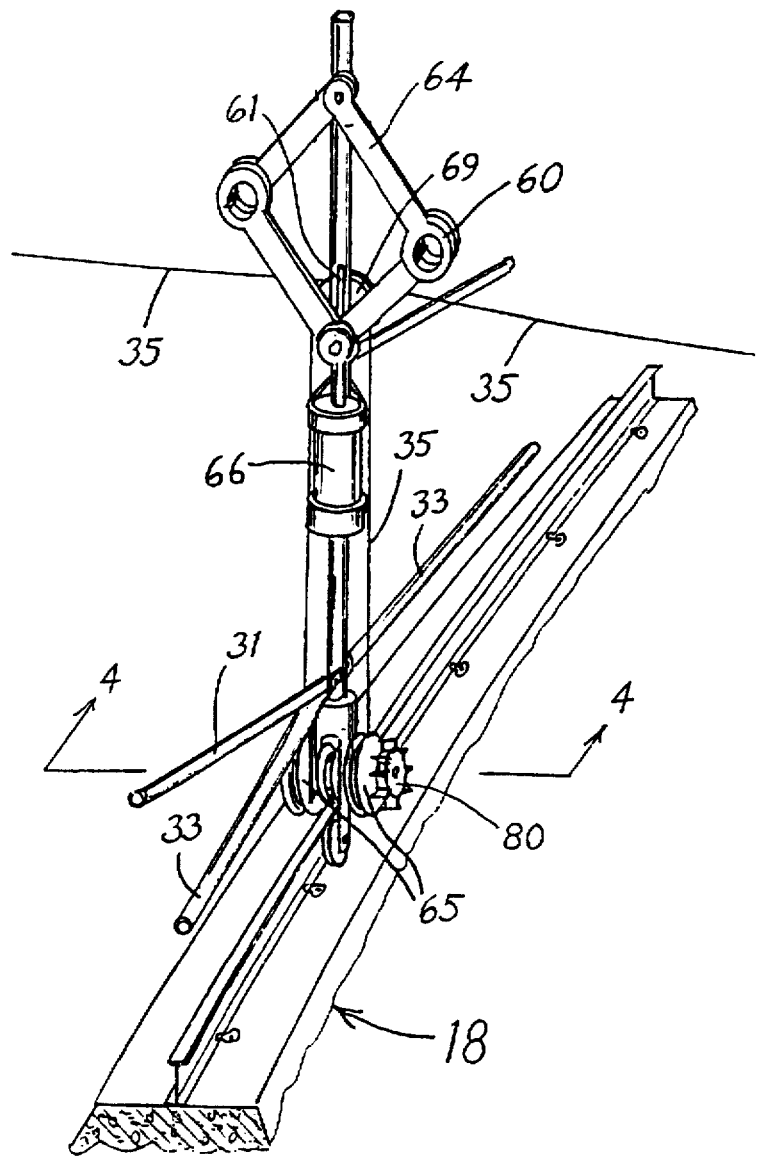
FIG. 3 is an enlarged isometric view of a pole with guyline reels in the base.

The trains are kept upright on the one-rail tracks 18 with guylines 35. As shown on FIGS. 3, 4 and 8, the trains on every other track have take-up reels 65 for the guylines 35. The reels are journaled to the wheel axles 67. Sheaves 69 are attached to the upper part of the poles. As shown in FIG. 3, one end of each guyline operatively engages the sheave 69 where it is redirected toward a take-up reel 65. The other end of each guyline is attached to an eyelet 71 on the upper part of a pole on an adjacent train. On the outer and inner trains the eyelets are on the base of cars 58.

Figure 4:
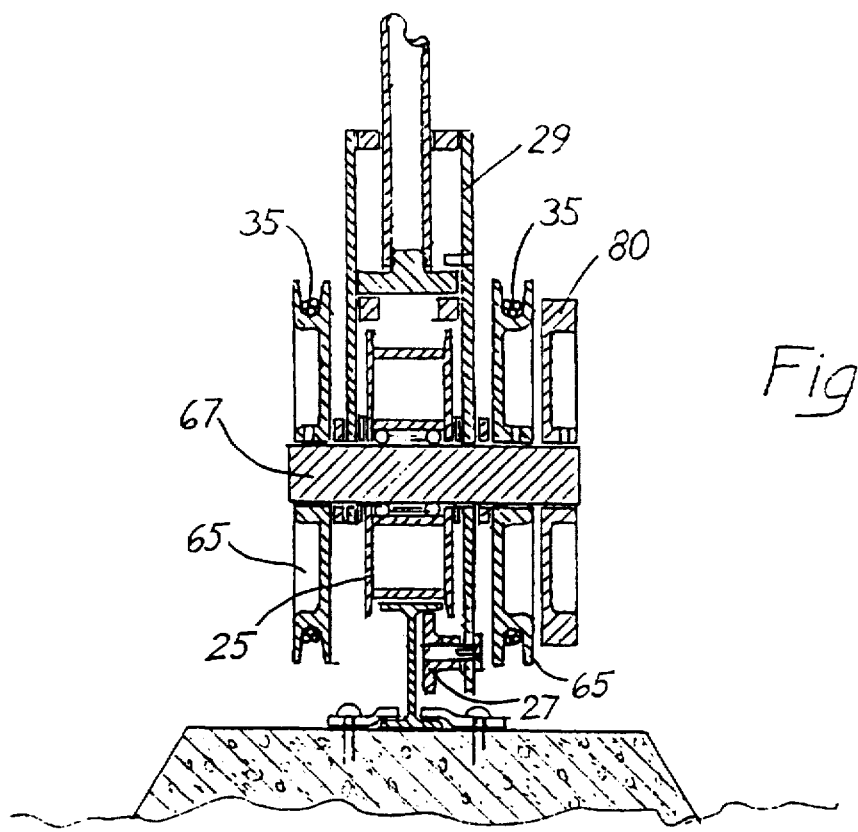
FIG. 4 is an enlarged cross-sectional view of the guylines reel shown in FIG. 3.

The take up reels 65 are driven by pinion gears 80. As shown in FIG. 4, the pinion gears 80 are journaled on the axles 67 of the wheels 25. As shown in FIG. 1, the racks 73 are supported on the ground near the transition tracks 15 in positions to engage the pinion gears 80 when the trains use the transition tracks 15.

Figure 8:
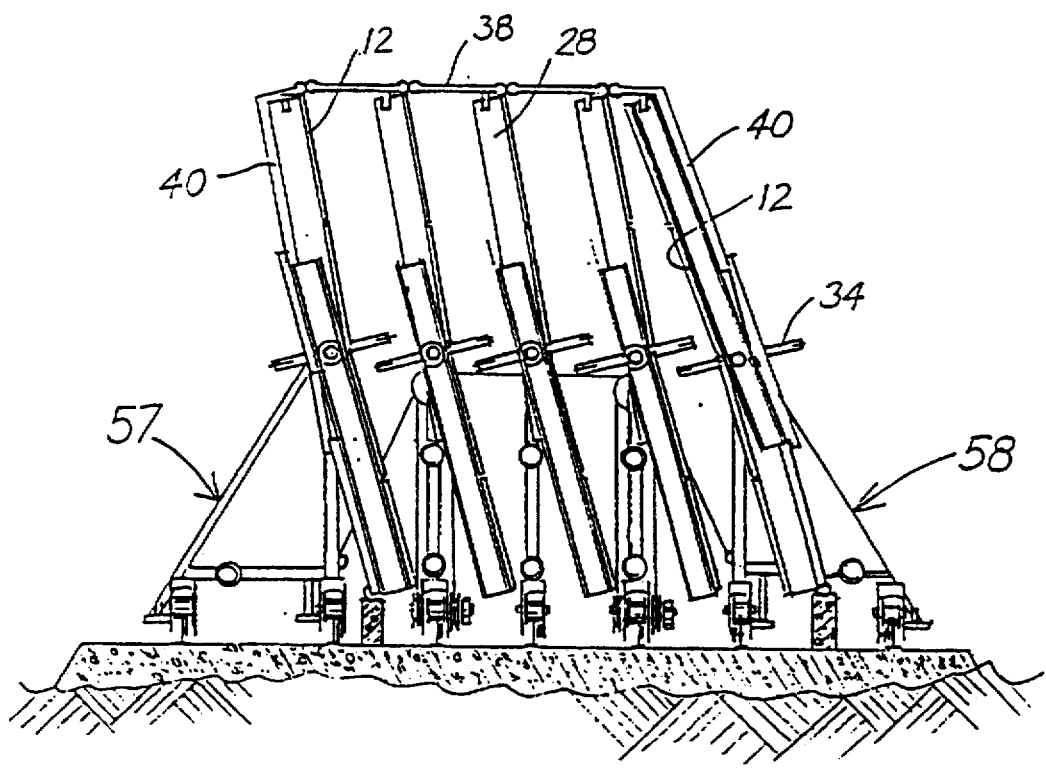
FIG. 8 is a cross-sectional view of the trains in their enclosed configuration.

Each framework has a roof panel 38 attached to one end of the beams 28. Gaskets 44 are attached to the edges of the panels. As shown in FIG. 8, the frameworks on the outer and inner tracks have wall panels 40 attached to their backs. At the ends of each train, a wall panel 42 is attached to the end framework 24. Cars 58 have a triangular wall panel 41 between the inclined struts 63. The frameworks 24 carried on the inner track 19 by the cars 58 are truncated to fit between the triangular wall panels 41.

As shown in FIG. 2, each pole 21 is equipped with a bearing 62, a hydraulic cylinder 70 with two end rods 72, a chain 74, and a free-spinning sprocket 76. A sprocket 77 is in a position above sprocket 76, but it is keyed to an axle 26. The sprockets 76 and 77 engage the chain 74, which is connected to both end rods 72 of the cylinder 70.

As shown in FIGS. 2 and 3, each pole 23 is equipped with two bearings 60, four linkage members 64 supporting the bearings 60, and a hydraulic cylinder 66 with one end rod 68. The linkage members 64 form a rhombus-shaped support mechanism for the two bearings 60. Each end rod 68 of a cylinder 66 is connected to one of the joints of the rhombus-shaped support mechanism. The body of the same cylinder 66 is connected to the opposite joint of the rhombus-shaped support mechanism.

Figure 7:
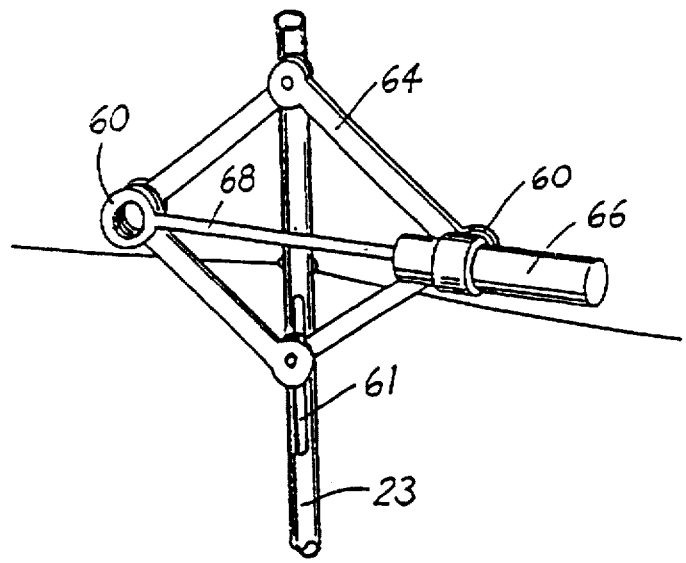
FIG. 7 is an isometric view of an alternate way to mount the hydraulic cylinders which move one end of the framework axles laterally.

FIGS. 2, 3, and 6 show cylinders 66 aligned vertically and FIG. 7 shows an alternate horizontal alignment of the cylinders 66. FIG. 2 shows the cylinder 66 on top of a pole 25 with the end rod 68 inside the pole 23, and FIGS. 3 and 6 show an alternate means of attaching the cylinders 66 with the cylinder 66 attached to the side of the poles 23 and with the end rods 68 outside the poles 23.

Approximately half of the rhombus linkages have their lower joints pinned to poles 23, as shown in FIGS. 2, 3, and 6, and half of the linkages have their upper joints pinned to the poles 23, as shown in FIG. 7. The opposite joints have their hinge pins tracked on the poles 23, as for example in a slot 61 with a button head of the pin inside the pole. This permits the joint to move up or down, but not laterally.

Figure 9:
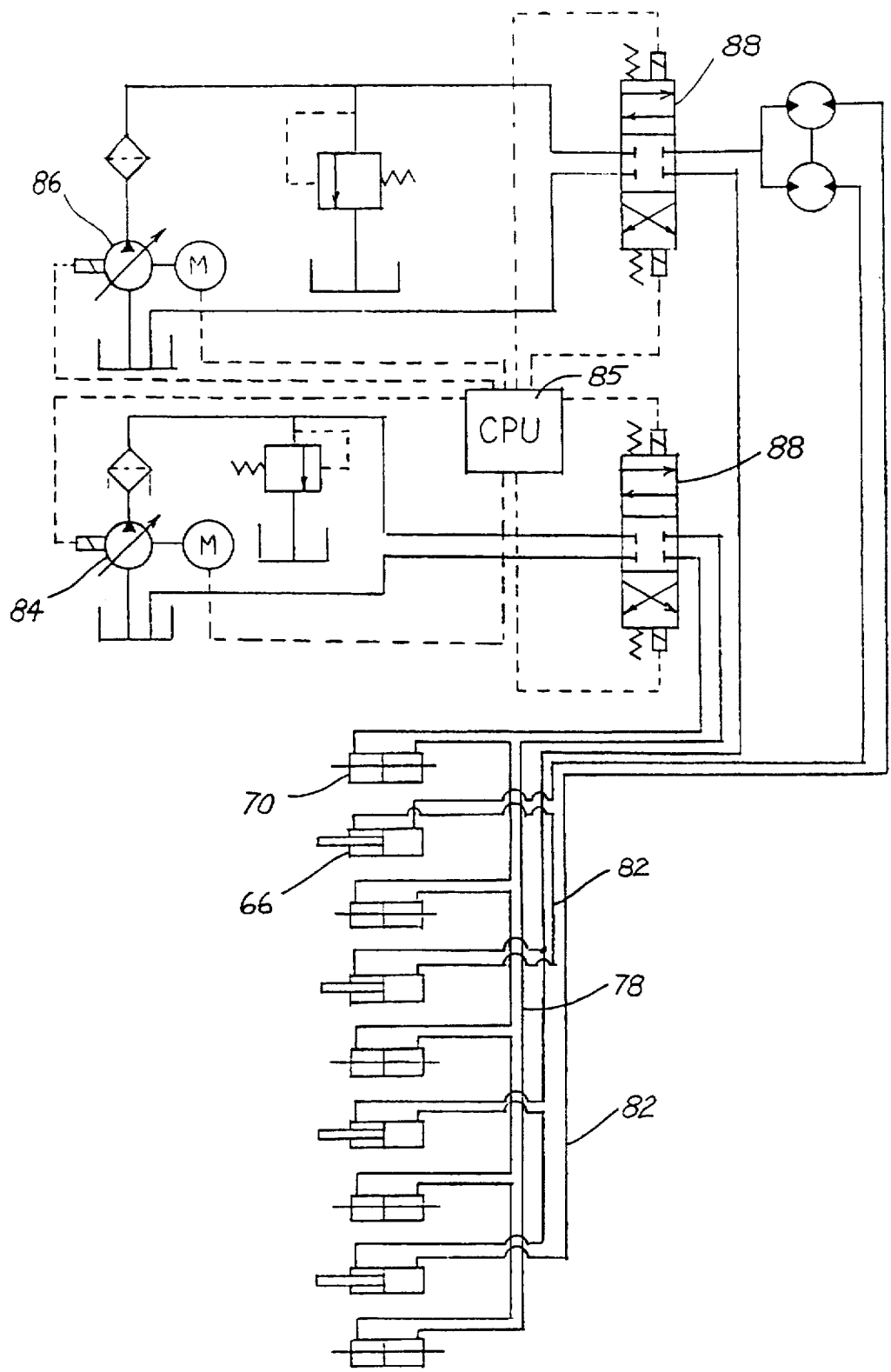
FIG. 9 is the schematic diagram of the hydraulic circuits which pivot the mirrors.

As shown in FIG. 9, cylinders 66 are connected into two synchronous circuits 82, one on each half of each train, with the rod end connected to the cap end of the next cylinder 66 toward the middle of the train. The diameters of the cylinders 66 and end rods 68 in each circuit as well as the lengths of the frameworks 24 they are connected to are predetermined to obtain pivoting of the frameworks proportional to the distance of the framework from the middle of the train. When the cylinders 66 are aligned vertically, as shown in FIGS. 2, 3, and 6, the length of the linkage members and the slopes of the linkage members 64 are critical in the predetermination to obtain the desired proportional pivoting. However, when the cylinders 66 are aligned horizontally, as shown in FIG. 7, the lengths and slopes of the linkage members 64 are not critical.

As shown in FIG. 9, the hydraulic cylinders 70 on each train are connected in series circuits 78. The cylinders 70 are equal in size as are the end rods 72. The cylinders 66 and 70 are supplied with pressurized hydraulic fluid from pumps 86 and 84 respectively. Computers 85 control the pumps 84 and 86 and circuit valves 88. Motive power for the trains may be supplied by hydraulic motors driving one or more of the wheels 25 on each train, or by locomotives 13.

OPERATION OF THE CONCENTRATOR

Each morning soon after sunrise, the trains start moving around the tracks in a clockwise direction. Computers calculate the sun's position and control the movement of the trains to keep the middle of the trains on the opposite side of the receiver from the sun.

Computers also calculate the correct tilt angles for the frameworks and adjust the speed of the pumps 84, which collectively tilt all of the frameworks on each train. The computers also calculate the correct askew angles for the frameworks and adjust the speed of the pumps 86 which collectively move the ends of the frameworks axles 26 laterally.

The hood 22 rotates continuously, synchronized with the change of the azimuth of the sun, to keep the hood opening facing the trains. The purpose of the hood is to reduce the heat loss from the receiver 14 and to redirect back to the receiver stray sunlight which would otherwise miss the receiver.

The mirrors 12 on each framework 24 focus sunlight on the receiver in a pattern which is much smaller than the framework. This is achieved by presetting the shape of the framework so that the front face is concave. A predetermined concavity is obtained by adjusting the tension in the wires 36 and by controlling the scissor-like rotation of the beams 28 about the axles 26 before the bolts 30 are tightened.

Each afternoon just before sunset the computers direct the trains start moving toward the closely-spaced tracks 20, and the pumps 84 to tilt the frameworks 24 to an almost vertical position as shown in FIG. 8. The frameworks 24 on cars 58 must rotate approximately 180 degrees to expose the wall panels 40. Pumps 86 reduce the askew angles of the frameworks. When the trains start converging on transition tracks 15, the pinion gears 80 engage gear racks 73 and start reeling in the guylines 35. Then the roof panels 38 and the wall panels 40, 41, and 42 come together to form a total enclosure for the mirrors 12. This enclosure procedure may also be initiated by high winds, lack of sunlight, or human intervention with the use of appropriate sensors or switches.

THEORY OF OPERATION

The orientation of the frameworks is calculated by the computers using the following equations. The equations assume that the tracks are level and concentric about the vertical axis of the receiver and that the movement of each train keeps the middle of the train on the opposite side of the receiver from the sun.

$$A = \arctan\left[\frac{\cos S \sin C}{(r/R) + (\cos S \cos C)}\right]$$

$$T = \arctan\left[\frac{\sqrt{(R\cos S \sin C)^2 + (r + R \cos S \cos C)^2}}{(R \sin S) + H}\right]$$

where:

A=the askew angle of the framework axle with respect to the longitudinal axis of the train, and T=the tilt of the framework measured from a horizontal plane, and S=the sun's elevation above the horizon, and r=the radius of the track, and H=the height of the receiver, and C=the central angle of a sector of the circular track subtended by the portion of the train from the middle of the train to the framework, and $$R = \sqrt{r^2 + H^2}$$

Table I gives the values of "A" and "T" for a typical train where, "r"=1000 feet, "H"=400 feet, and "C" varies from 2 to 18 degrees, and "S" varies from 15 to 75 degrees.

TABLE I

| S | A | T | A | T | A | T |
|---|---|---|---|---|---|---|
| | C = 2 | | C = 4 | | C = 6 | |
| 15 | 1.02 | 71.60 | 2.04 | 71.60 | 3.06 | 71.58 |
| 25 | .99 | 66.60 | 1.98 | 66.59 | 2.96 | 66.57 |
| 35 | .94 | 61.60 | 1.88 | 61.59 | 2.81 | 61.57 |
| 45 | .86 | 56.60 | 1.73 | 56.58 | 2.59 | 56.56 |
| 55 | .76 | 51.60 | 1.53 | 51.58 | 2.29 | 51.56 |
| 65 | .63 | 46.60 | 1.25 | 46.58 | 1.88 | 46.57 |
| 75 | .44 | 41.60 | .87 | 41.59 | 1.31 | 41.57 |
| | C = 8 | | C = 10 | | C = 12 | |
| 15 | 4.08 | 71.56 | 5.10 | 71.53 | 6.12 | 71.50 |
| 25 | 3.95 | 66.55 | 4.94 | 66.52 | 5.93 | 66.48 |
| 35 | 3.75 | 61.54 | 4.69 | 61.51 | 5.62 | 61.49 |
| 45 | 3.46 | 56.54 | 4.32 | 56.50 | 5.18 | 56.46 |
| 55 | 3.05 | 51.54 | 3.82 | 51.50 | 4.58 | 51.46 |
| 65 | 2.50 | 46.54 | 3.12 | 46.51 | 3.75 | 46.46 |
| 75 | 1.74 | 41.55 | 2.18 | 41.52 | 2.61 | 41.49 |
| | C = 14 | | C = 16 | | C = 18 | |
| 15 | 7.14 | 71.47 | 8.16 | 71.43 | 9.18 | 71.39 |
| 25 | 6.92 | 66.44 | 7.90 | 66.39 | 8.89 | 66.34 |
| 35 | 6.56 | 61.42 | 7.50 | 61.36 | 8.43 | 61.30 |
| 45 | 6.05 | 56.41 | 6.91 | 56.35 | 7.77 | 56.28 |
| 55 | 5.34 | 51.40 | 6.10 | 51.34 | 6.86 | 51.27 |
| 65 | 4.37 | 46.42 | 4.99 | 46.36 | 5.61 | 46.30 |
| 75 | 3.04 | 41.46 | 3.47 | 41.41 | 3.90 | 41.36 |

Table I shows that the concentrators described in most U.S. patents cited above are not accurate enough, because their askew angles ("A" values in the table) remain fixed during the day. This causes a theoretical focusing error of as much as 49.6 feet at the ends of the trains (where "C"=18 degrees).

By contrast, the proposed concentrator has no significant theoretical focusing error. Table I shows that the change in the askew angles is almost exactly proportional to the distance along the train from the middle of the train, and that the tilt angles on each train change equally.

Fine tuning is necessary and appropriate in this instance, because transporting the mirrors along the concentric tracks focuses reflected sunlight precisely on a known spot, but the spot is not on the receiver. The movement is precise because the movement rotates the mirrors about the vertical axis of the receiver with an extremely long lever arm, the radius of the track. The fine tuning must be both precise and accurate. This is accomplished by moving one end of each framework axle a small distance laterally.

The concave shape of each framework is preset in accordance with the following equations:

$$B = 14.3 W/R$$

$$D = L^2/24R$$

where:

B=the angle between the axes of the lapped beams, and

W=the width of the framework (length of a beam made up of two lapped component beams), and R=the distance from the framework to the receiver, and D=the lateral deflection of the framework axle at midspan, and L=the length of the framework from bearing to bearing.

The effects of wind on the motors which pivot the frameworks may be neutralized by pivoting half of the frameworks toward the right side of each train and half of the frameworks toward the left side of each train and by linking frameworks which pivot in opposite directions. Theoretically the effects of wind are neutralized when the algebraic sum of the area moments of rotation of the linked frameworks is zero. The area moment of rotation is defined as the product of a force and the perpendicular distance to its axis of rotation, where the force is the product of the area of a surface and the pressure acting on it, and where the perpendicular distance is the length of the perpendicular line between the resultant force acting through the centroid of the area and the axis of rotation.

One axis of rotation is the axle of the frameworks. The effects of wind on this rotation are neutral because the axle is at midheight.

Another axis of rotation is the vertical axis of the poles 21. The moments of rotation about these axes are balanced, since half of the frameworks pivot to the right side of the trains and half toward the left side. The rotations are linked both by the rhombus-shaped linkages and by the hydraulic circuits.

CONCLUSIONS AND SCOPE OF THE INVENTION

For the first time, there is a concentrator with mirrors on movable supports that is accurate enough for power plants and capable of being nested compactly and enclosed. The proposed concentrator is also more efficient than concentrators with heliostats. It is less expensive than previous concentrators, because it is light weight and relatively simple. It is inexpensive to operate because it is automatic and because the power required to pivot the mirrors against the wind is boosted by wind power itself. And finally it is easy to maintain because it is stored in an enclosure at night and during storms, rain, and hail.

This embodiment of the invention is intended as an example and not a limitation of the scope of the invention.

I claim:

1. A solar concentrator including a plurality of mirrors which focus sunlight on a central receiver comprising in combination:

a) a plurality of frameworks, and b) a plurality of vehicles for supporting and moving said frameworks, and c) a latticework attached to said vehicles whereby the vehicles are kept upright and spaced apart, said latticework comprised of guylines aligned approximately toward the vertical axis of the receiver and struts aligned approximately circumferentually with respect to the vertical axis of the receiver at the center, and d) means of fixedly attaching a plurality of said mirrors to each framework whereby sunlight reflected from said plurality of mirrors may be focused on the receiver, and e) means of pivotally attaching said frameworks to said vehicles whereby the frameworks may pivot about two axes, and f) means of moving said vehicles and pivoting of said frameworks whereby sunlight remains focused on the receiver.

2. A solar concentrator according to claim 1 further comprising:

a) a plurality of concentric tracks with the vertical axis of the receiver at the center, and b) a plurality of relatively closely-spaced tracks, and c) a plurality of transition tracks connecting said concentric tracks and said closely-spaced tracks, and d) means of changing the length of said guylines whereby they remain reasonably taut as the latticework moves along the transition tracks, and e) means of enclosing said frameworks.

3. A solar concentrator as described in claim 2 wherein said means of enclosing the frameworks is further comprised of panels attached to said frameworks whereby when the vehicles are on the closely-spaced tracks and the frameworks are suitably pivoted, the panels form an enclosure.

4. A solar concentrator according to claim 1 wherein each of said frameworks has a front face with a predetermined concabity ans wherein each of said frameworks is comprised of:

a) an approximately horizontal axle, and b) means of stiffening and curving said axle whereby said predetermined concavity is preset in the axle, and c) a plurality of beams attached to the axle at predetermined intervals along the axle, wherein said beams are comprised of two overlapping members connected to each other with their axes askew whereby said predetermined concavity is preset in the beams, and d) means of clamping the mirrors to said beams, said mirrors having a rectangular shape with one dimension approximately equal to said predetermined interval.

5. A solar concentrator as described in claim 1 wherein said vehicles are further comprised of:

a) a plurality of type-one vehicles supporting one bearing, and b) a plurality of type-two vehicles sequenced alternately on each track with said type-one vehicles and supporting two bearings, and c) means of supporting each framework on the two adjacent vehicles on each track.

6. A solar concentrator as described in claim 5 wherein said means of supporting each framework on the two adjacent vehicle is further comprised of:

a) universal-joint means of connecting pairs of frameworks whereby one end of the axle of one framework is connected to one end of the axle of another framework by a universal joint, and b) journaled support of the paired frameworks near the universal joint by the bearing of a type-one vehicle, and c) journaled support of one end of each axle of the frameworks by one of the bearings of a type-two vehicle, whereby each type-two vehicle supports one end of two axles.

7. A solar concentrator as described in claim 6 wherein said means of pivoting the frameworks about one of said two axes is comprised of moving the two bearings on each of said type-two vehicles either closer together or farther apart along an approximately transverse path with respect to the tracks.

8. A solar concentrator including a plurality of movable frameworks, a plurality of mirrors on each framework, a central receiver a selected distance apart from said frameworks, and positioning means to position each framework to focus the rays of the sun on the central receiver, comprising:

a) a plurality of concentric tracks with the vertical axis of the receiver at the center, and b) a plurality of vehicles each having one or more wheels operatively engaging one of said tracks, and c) a plurality of frameworks each pivotally mounted on two of said vehicles for pivoting about two axes, and d) means of attaching a plurality of mirrors to each framework which in combination comprises a multi-faceted surface with a predetermined concavity, and e) means of moving the vehicles and the pivoting of the frameworks whereby the mirrors continuously focus sunlight on the receiver.

9. A solar concentrator according to claim 8 further comprising:

a) a plurality of relatively closely-spaced tracks, and b) a plurality of transition tracks connecting said concentric tracks and said closely-spaced tracks, and c) a latticework attached to said vehicles whereby the vehicles are kept upright and spaced apart, said latticework comprised of guylines aligned approximately toward the vertical axis of the receiver and struts aligned approximately circumferentually with respect to the vertical axis of the receiver at the center, and d) means of changing the length of said guylines whereby they remain reasonably taut as the latticework moves along the transition tracks, and e) means of enclosing said frameworks.

10. A solar concentrator as described in claim 9 wherein said means of enclosing the frameworks is further comprised of panels attached to said frameworks whereby when the vehicles are on the closely-spaced tracks and the frameworks are suitably pivoted, the panels form an enclosure.

11. A solar concentrator according to claim 8 wherein each of said frameworks is comprised of:

a) an approximately horizontal axle, and b) means of stiffening and curving said axle whereby said predetermined concavity is preset in the axle, and c) a plurality of beams attached to the axle at predetermined intervals along the axle, wherein said beams are comprised of two overlapping members connected to each other with their axes askew whereby said predetermined concavity is preset in the beams, and d) means of clamping the mirrors to said beams, said mirrors having a rectangular shape with one dimension approximately equal to said predetermined interval.

12. A solar concentrator as described in claim 8 wherein said vehicles are further comprised of:

a) a plurality of type-one vehicles supporting one bearing, and b) a plurality of type-two vehicles sequenced alternately on each track with said type-one vehicles and supporting two bearings, and c) means of supporting each framework on the two adjacent vehicles on each track.

13. A solar concentrator as described in claim 12 wherein said means of supporting each framework on the two adjacent vehicle is further comprised of:

a) universal-joint means of connecting pairs of frameworks whereby one end of the axle of one framework is connected to one end of the axle of another framework by a universal joint, and b) journaled support of the paired frameworks near the universal joint by the bearing of a type-one vehicle, and c) journaled support of one end of each axle of the frameworks by one or the bearings or a type-two vehicle, whereby each type-two vehicle supports one end of two axles.

14. A solar concentrator as described in claim 8 wherein said means of pivoting said frameworks about one of said two axes is comprised of moving the two bearings on each of said type-two vehicles either closer together or farther apart along an approximately transverse path with respect to the tracks.

15. A method of handling rigid mirrors whereby they focus sunlight on a receiver during clear days and become enclosed at night and during inclement weather and comprising the steps of:

a) moving the mirrors in concentric paths about the vertical axis of the receiver at the center synchronized with the changing azimuth of the sun whereby the mirrors remain on the opposite side of the receiver from the sun, and b) pivoting groups of the moving mirrors about approximately vertical axes which move with the mirrors whereby each group pivots about a different moving vertical axis, and whereby sunlight reflected from the mirrors remains focused on the vertical axis of the receiver, and c) pivoting groups of the moving mirrors about approximately horizontal axes which move with the mirrors whereby each group pivots about a different moving horizontal axis, and whereby sunlight reflected from the mirrors remains focused on the receiver, and d) nesting the mirrors compactly, and e) enclosing said nested mirrors at night and during inclement weather.

16. A method of handling rigid mirrors as described in claim 15 whereby they focus sunlight on a receiver during clear days and become enclosed at night and during inclement weather and comprising the steps of:

a) collecting wind energy with approximately half of said mirrors, and b) using said collected wind energy to help pivot approximately the remaining mirrors.

17. A method of handling rigid mirrors as described in claim 15 whereby they focus sunlight on a receiver during clear days and become enclosed at night and during inclement weather and comprising the steps of:

a) collecting energy from parts which move down, and b) using said collected energy to assist with moving other parts up.

* * * * *